(12) United States Patent
Hassan

(10) Patent No.: US 11,714,237 B2
(45) Date of Patent: Aug. 1, 2023

(54) ASSEMBLY COMPRISING FIRST AND SECOND PHOTONIC CHIPS THAT ARE ADJOINED TO EACH OTHER

(71) Applicant: COMMISSARIAT A L'ENERGIE ATOMIQUE ET AUX ENERGIES ALTERNATIVES, Paris (FR)

(72) Inventor: Karim Hassan, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 71 days.

(21) Appl. No.: 17/454,655

(22) Filed: Nov. 12, 2021

(65) Prior Publication Data

US 2022/0171131 A1    Jun. 2, 2022

(30) Foreign Application Priority Data

Nov. 30, 2020  (FR) ..................... 20 12427

(51) Int. Cl.
 *G02B 6/26* (2006.01)
 *G02B 6/293* (2006.01)
(52) U.S. Cl.
 CPC ........... *G02B 6/26* (2013.01); *G02B 6/29331* (2013.01)
(58) Field of Classification Search
 CPC ....... G02B 6/26; G02B 6/29331; G02B 6/305
 See application file for complete search history.

(56) References Cited

U.S. PATENT DOCUMENTS

| 9,766,400 B2 | 9/2017 | Hassan et al. |
| 10,288,812 B1 | 5/2019 | Evans et al. |
| 2002/0076150 A1 | 6/2002 | Zhao et al. |
| 2016/0327748 A1 | 11/2016 | Stern et al. |

(Continued)

FOREIGN PATENT DOCUMENTS

| FR | 3 034 875 A1 | 10/2016 |
| WO | WO 2019/152990 A1 | 8/2019 |

OTHER PUBLICATIONS

French Preliminary Search Report dated Aug. 11, 2021 in French Application 20 12427 filed on Nov. 30, 2020, 11 pages (with English Translation of Categories of Cited Documents & Written Opinion).

(Continued)

*Primary Examiner* — Eric Wong
(74) *Attorney, Agent, or Firm* — Oblon, McClelland, Maier & Neustadt, L.L.P.

(57) ABSTRACT

An assembly including a first waveguide produced in a first photonic chip and that extends in a first direction in order to guide an optical signal at a wavelength $\lambda$, an array of a plurality of second waveguides, which is produced in a second photonic chip adjoined to the first photonic chip, and a power summer including inputs that are optically connected to one end of each of the second waveguides. Each of the second waveguides includes upstream and downstream segments that are offset with respect to each other in the second direction. The configurations of the first waveguide and of the second waveguides are such that, for any position of the first waveguide above the array, the distance between one of the segments of the first waveguide and one of the segments of one of the second waveguides is smaller than $\lambda/2$.

10 Claims, 3 Drawing Sheets

(56) References Cited

U.S. PATENT DOCUMENTS

| | | |
|---|---|---|
| 2016/0349454 A1 | 12/2016 | Zhang et al. |
| 2018/0156979 A1 | 6/2018 | Stern et al. |
| 2019/0094468 A1* | 3/2019 | Novack ............... G02B 6/1228 |
| 2019/0265415 A1 | 8/2019 | Psaila et al. |
| 2021/0003775 A1 | 1/2021 | Psaila et al. |
| 2021/0215897 A1 | 7/2021 | Epitaux et al. |
| 2022/0146749 A1* | 5/2022 | Bandyopadhyay .... G02B 6/125 |

OTHER PUBLICATIONS

Romero-Garcia et al., "Alignment Tolerant Couplers for Silicon Photonics", IEEE Journal of Selected Topics in Quantum Electronics, vol. 21, No. 6, Nov./Dec. 2015, 14 pages.

Wu et al., "Ohmic contact to n-type Ge with compositional Ti nitride", Applied Surface Science 284, 2013, pp. 877-880.

Moscoso-Martir et al., "Hybrid Silicon Photonics Flip-Chip Laser Integration with Vertical Self-Alignment", 2017 Conference on Lasers and Electro-Optics Pacific Rim (CLEO-PR), 2017, 4 pages.

Hunsperger, "Integrated Optics: Theory and Technology", Sixth Edition, Springer, 2009, 3 pages.

Taylor et al., "Guided Wave Optics", Proceedings of the IEEE, vol. 62, No. 8, Aug. 1974, 17 pages.

Pinguet et al., "High-Volume Manufacturing Platform for Silicon Photonics", Proceedings of the IEEE, vol. 106, No. 12, Dec. 2018, 10 pages.

Manik et al., "Fermi-level unpinning and low resistivity in contacts to n-type Ge with a thin ZnO interfacial layer" Applied Physics Letters, 101, 182105, 2012, 6 pages.

* cited by examiner

ASSEMBLY COMPRISING FIRST AND SECOND PHOTONIC CHIPS THAT ARE ADJOINED TO EACH OTHER

The invention relates to an assembly comprising first and second photonic chips adjoined to each other by bonding via a bonding interface. The invention also relates to a photonic chip for producing this assembly and to a process for fabricating this assembly.

In such assemblies, it is necessary to optically connect optical components contained in the first photonic chip to optical components contained in the second photonic chip. To this end, an optical device for coupling the two photonic chips is produced partially in the first photonic chip and partially in the second photonic chip.

To bond the first photonic chip to the second photonic chip, it is necessary to use a placing tool that automatically positions the first photonic chip in the desired location on the second photonic chip. However alignment errors conventionally observed with such placing tools are, for example, comprised between +3 µm and −3 µm, notably in a direction perpendicular to the direction of propagation of the optical signal. The optical coupling device must therefore be robust with respect to such alignment errors.

Currently, known optical coupling devices that are sufficiently robust with respect to such alignment errors comprise many optical components such as lenses and mirrors.

Prior art is also known from US2002/076150A1, WO2019/152990A1, US10288812B1, US2016/349454A1, US2019/265415A1 and US2016/327748A1. These documents describe devices for achieving optical coupling between optical fibres and waveguides of a photonic chip. These optical coupling devices are not robust with respect to alignment errors.

The invention aims to propose an assembly of two photonic chips that are bonded to each other and that comprise an optical coupling device that is simpler to produce while remaining tolerant with respect to alignment errors at least in one given direction.

One of its subjects is therefore such an assembly.

Another subject of the invention is a second photonic chip for producing the above assembly.

Lastly, another subject of the invention is a process for fabricating the above assembly.

The invention will be better understood on reading the following description, which is given solely by way of non-limiting example, with reference to the drawings, in which.

In the rest of this description, features and functions that are well known to those skilled in the art are not described in detail.

In this description, detailed examples of embodiments are first described in Section I with reference to the figures. Next, in Section II, variants of these embodiments are presented. Lastly, the advantages of the various embodiments are presented in Section III

SECTION I: EXAMPLES OF EMBODIMENT

Figure 1:
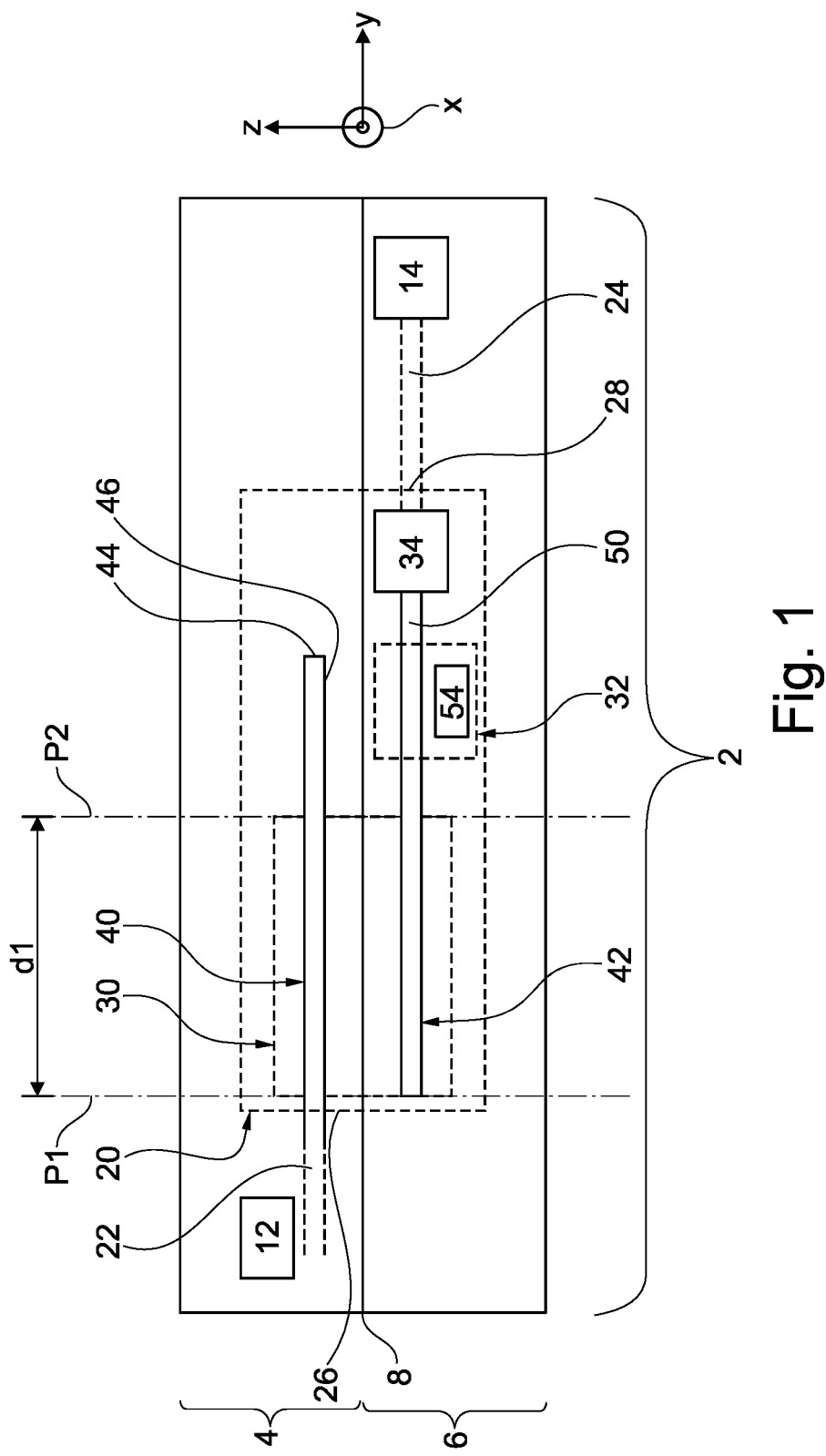
FIG. 1 is a schematic illustration in vertical cross section of an assembly comprising first and second photonic chips adjoined by bonding to each other.

FIG. 1 shows an assembly 2 comprising a photonic chip 4 bonded to a photonic chip 6 via a bonding interface 8. The interface 8 lies in a horizontal plane parallel to the X- and Y-directions of an orthogonal coordinate system XYZ. In this coordinate system, Z-direction designates the vertical direction. Below, terms such as "above", "below", "upper" and "lower" and the like are defined with respect to the Z-direction.

The bonding between the chips 4 and 6 may be direct bonding, i.e. bonding without addition of material, or bonding using a layer of adhesive interposed between the two chips 4 and 6.

The chips 4 and 6 each comprise at least one photonic component that generates, measures, converts or transports an optical signal. Typically, the wavelength $\lambda$ of the optical signal is comprised between 1260 nm and 1625 nm and, preferably, between 1260 nm and 1360 nm (O band) or between 1530 nm and 1565 nm (C band). In this example, the wavelength $\lambda$ is equal to 1310 nm.

To simplify FIG. 1, a single photonic component 12 has been shown in the chip 4 and a single photonic component 14 has been shown in the chip 6.

The assembly comprises an optical coupling device 20 that allows the chips 4 and 6 to be connected optically. Here, the device 20 optically connects the component 12 to the component 14 through the interface 8. To this end, the device 20 optically connects an input waveguide 22, located inside the chip 4, to an output waveguide 24 located inside the chip 6. The waveguides 22 and 24 are optically connected to the optical components 12 and 14, respectively.

The device 20 transfers most of the energy of the optical signal propagating through the waveguide 22 to the waveguide 24. Here, by "most of the energy", what is meant is at least 50% or 60% of the energy, at the wavelength $\lambda$, of the optical signal propagating through the waveguide 22. Below, this percentage is also called the coefficient of transmission. One of the portions of the waveguides 22 and 24 has been drawn with dashed lines to indicate that only part of these waveguides has been shown in FIG. 1.

In this embodiment, the waveguides are configured to guide and propagate the optical signal at the wavelength $\lambda$. To this end, each waveguide comprises a core made of a first material encircled by a cladding made of a second material. The refractive index of the core is higher than the refractive index of the cladding. Typically, the refractive index of the core is at least 1.2 times or 1.3 times higher than the refractive index of the cladding. In this example of embodiment, the core of the waveguides is made of silicon and their cladding is made of silicon oxide. The cross section of these waveguides is rectangular or T-shaped. In the figures, only the core of the waveguide has been shown.

One portion of the device 20 is produced inside the chip 4. This portion comprises an input 26 that receives the optical signal propagating through the guide 22. The device 20 also comprises another portion produced inside the chip 6. This other portion comprises an output 28 that emits the optical signal into the waveguide 24.

Between the input 26 and the output 28, the device 20 comprises. in succession:
an evanescent-coupling region 30;
a phase-matching region 32; and
a power summer 34.

Evanescent coupling is well-known. For example, it is defined in the following book R. G. Hunsperger: "Integrated Optics: Theory and Technology", Springer, 2002, pages 154-155.

The region 30 extends from a vertical plane P1 to a vertical plane P2. The planes P1 and P2 are parallel and orthogonal to the Y-direction. The plane P1 is located after the input 26 and the plane P2 is located before the output 28.

The region 30 comprises a waveguide 40 produced in the chip 4 and an array 42 of a plurality of waveguides produced, below, in the chip 6.

In this first embodiment, the guide 40 is a rectilinear waveguide that mainly extends parallel to the Y-direction. In other words, in a horizontal plane, the angle θ between the Y-direction and the axis of the guide 40 is comprised between −1° and +1°.

The guide 40 starts at the input 26 and ends well after the plane P2 at an end 44. To this end, the length of the guide 40 is larger than the distance dl separating the planes P1 and P2. Here, the length of the guide 40 is at least larger than the distance dl+3 μm and, preferably, larger than the distance dl+6 μm or +10 μm.

By virtue thereof, even if the chip 4 is placed on the chip 6 using a placing tool the precision of which, in the Y-direction, is about 3 μm, it will be absolutely certain that the guide 40 will pass right through the space comprised between the planes P1 and P2 and therefore pass right through the evanescent-coupling region 30.

By way of example, the width of the cross section of the guide 40 is equal to 400 nm and its thickness is equal to 300 nm. The guide 40 also has a lower face 46 that lies in a horizontal plane. The refractive index of the guide 40 is denoted $n_{r40}$ and its effective propagation index is denoted $n_{eff40}$.

The effective index of a waveguide is proportional to the "phase constant of the mode". It is defined by the following relationship: $n_g = n_{eff} - \lambda dn_{eff}/d\lambda$, where $n_g$ is the group index and $\lambda$ is the wavelength of the optical signal guided by this guide. The effective index is, for example, determined by numerical simulation or experimentally.

The array 42 starts at the plane P1 and ends at the plane P2. The plane P1 comprises at least one of the far ends of the waveguides of the array 42. The plane P2 comprises at least one of the near ends of the waveguides of the array 42. This array 42 will now be described in more detail with reference to FIG. 2.

Each of the near ends of the waveguides of the array 42 is connected to one respective input of the summer 34 by way of respective waveguides 50. The waveguides 50 each pass through the region 32. The function of the region 32 is to modify the phase of the optical signals propagating through each of the guides 50 so that the phases of these optical signals received on the inputs of the summer 34 are equal. To this end, the region 32 comprises one adjustable phase shifter 54 associated with each of the waveguides 50 passing through the region 32. Here, each phase shifter 54 is a heater and allows the waveguide 50 with which it is associated to be heated specifically. Heating a segment of the guide 50 modifies its optical properties and allows the phase of the optical signal propagating inside this guide to be modified. Although not shown, each device 54 is connected to a control unit integrated into the chip 6. This unit controls each device 54 so that the phases of the optical signals propagating through the guides 50 are equal at the inputs of the summer 34. For example, to this end, the control unit measures the energy of the optical signal output from the summer 34 and automatically and continuously adjusts, depending on this measurement, the power supplied to the devices 54 in order to maximize the energy of the optical signal on this output of the summer 34. Specifically, the energy output from the summer 34 is maximum when the optical signals received on its inputs are in phase.

The summer 34 comprises inputs that are optically connected to the end of each of the guides 50 in order to receive the optical signals to be summed. It also comprises an output optically connected to the output 28.

The summer 34 combines the various optical signals simultaneously received on its inputs to form a single optical signal that is delivered to its output. During this combination, the energies of the optical signals received on its inputs are added to one another and hence the energy of the signal delivered to the output is higher than the energy of each of the optical signals received on its inputs. For example, the summer 34 is produced by connecting in cascade a plurality of elementary power summers. Each of these elementary summers comprises only two inputs for receiving two optical signals to be added and a single output to which is delivered the optical signal resulting from this addition. The "connection in cascade" consists in connecting the outputs of two different elementary summers to respective inputs of another elementary summer and so on to obtain the number of inputs required for the summer 34. For example, an elementary summer is a multimode interferometer (MMI).

Figure 2:
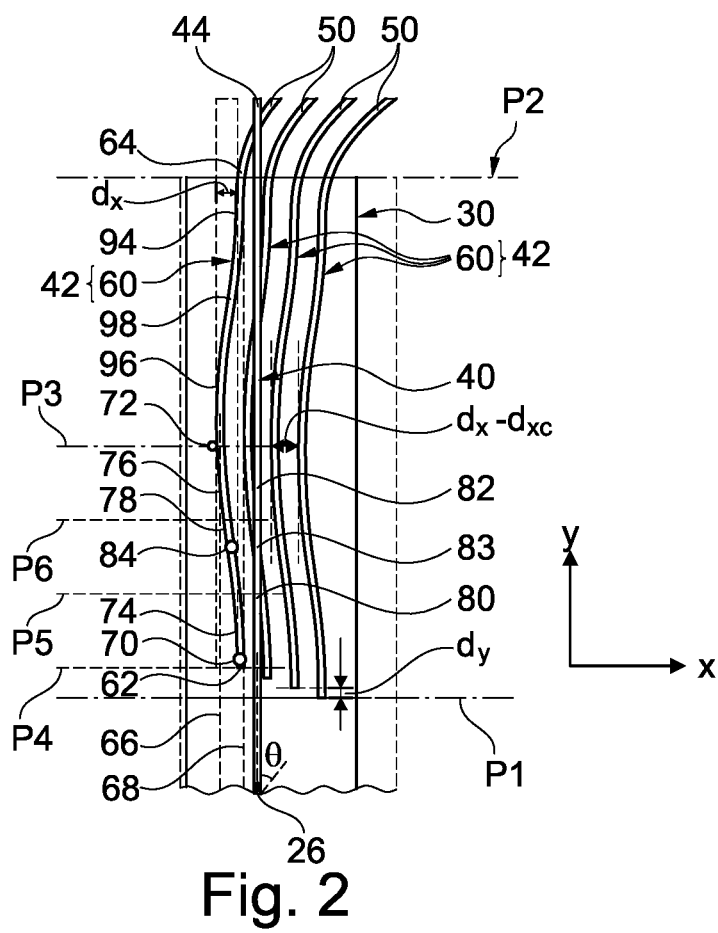
FIG. 2 is an illustration of a view from above of a coupling region of a device for coupling first and second photonic chips of the assembly of FIG. 1.

FIG. 2 shows in more detail a first embodiment of the evanescent-coupling region 30. The array 42 comprises N waveguides 60 that are identical to one another. The guides 60 are placed beside one another in a horizontal plane. Each guide 60 is offset with respect to its nearest neighbour to the left:
by a pitch $d_x$-$d_{xc}$ in the X-direction, and
by a pitch $d_y$ in the Y-direction.

In this text, the terms left and right are defined with respect to the X-direction.

The number N of guides 60 is chosen so that the distance $d_2$ between the guide 60 most to the right and the guide 60 most to the left is larger than the tolerance, in the X-direction, in the position of the placing tool used to assemble the chips 4 and 6. Here, the precision of the placing tool in the X-direction is about 3 μm. Thus, the number N is chosen so that the distance $d_2$ is larger than 6 μm. This number N is chosen after the pitch $d_x$-$d_{xc}$ has been determined. By way of illustration, in FIG. 2, N is equal to four.

Since the guides 60 are structurally identical to one another, below, only one of these guides 60 is described in more detail.

The guide 60 mainly extends in the Y-direction from a far end 62 to a near end 64. The near end 64 is optically connected to a respective guide 50. Here, the cores of the guides 50 and 60 form only a single block of material. Thus, the guide 60 is extended, beyond the end 64, by the guide 50.

The end 62 is free and marks the start of the guide 60. The ends 62 and 64 of all the guides 60 are located between the planes P1 and P2. Here, the end 64 of the guide 60 furthest to the left is located in the plane P2 and the end 62 of the guide 60 furthest to the right is located in the plane P1.

The optical coupling between the guides 50 and the guide 40 must be weak and, preferably, non-existent. To this end, here, each guide 50 follows a quadrant path the radius of curvature of which is two or three times smaller than the radius of curvature $Rmin_{60}$ of the guide 60. This radius of curvature is sufficiently large that the optical losses due to the curvature of the guide 50 remain low. To this end, the radius of curvature of the guide 50 is larger than 5 µm, 15 µm or 20 µm. For example, here, the radius of curvature of the guide 50 is equal to 25 µm.

The guide 60 is symmetric with respect to a plane P3 perpendicular to the Y-direction. Therefore, below, only half, referred to as "upstream", of the guide 60 is described in detail, this half being located between the end 62 and this plane P3. The portion referred to as "downstream" may be deduced by symmetry with respect to the plane P3.

Between these two ends 62 and 64, the guide 60 is entirely comprised between a left lateral limit 66 and a right lateral limit 68. The limits 66 and 68 are rectilinear and parallel to the Y-direction. The upstream half of the guide 60 is curved and touches at least once the limit 66 and at least once the limit 68. Here, at each point of contact between the guide 60 and the limits 66 and 68, the guide 60 is tangent to the touched limit. In this embodiment, the upstream half of the guide 60 has only two points of contact, 70 and 72, respectively. The point 70 is located at the far end 62 and the point 72 is located level with the plane P3.

The upstream half of the guide 60 comprises an upstream segment 74, an intermediate segment 78 and a downstream segment 76 located immediately after one another along the guide 60. The segment 74 extends from a plane P4 to a plane P5. The segment 76 extends from a plane P6 to the plane P3. The intermediate segment 78 extends from the plane P5 to the plane P6. The planes P4, P5 and P6 are parallel to the plane P1. The plane P4 contains the end 62.

The segments 74 and 76 are offset with respect to each other in the X-direction. Here, they each extend over at least 25% or 30% of the length of the upstream half of the guide 60. The segments 74, 78 and 76 are shaped to optically couple, via evanescent coupling, to an upstream segment 80, an intermediate segment 83 and a downstream segment 82 of the guide when the segments are located in proximity to one another, respectively. The upstream segment 80 extends from the plane P4 to the plane P5. The downstream segment 82 extends from the plane P6 to the plane P3. The intermediate segment 83 extends from the plane P5 to the plane P6.

A segment of the guide 60 is considered to be in proximity to a segment of the guide 40 if the distance that separates them is smaller than λ/2 over the entire length of these segments.

To easily obtain evanescent optical coupling through the interface 8 between the segments 74 and 80 and between the segments 76 and 82, these segments mainly extend parallel to the Y-direction. To this end, the smallest radius of curvature of the segments 74 and 76 is at least two or three times larger than the smallest radius of curvature $Rmin_{60}$ of the intermediate segment 78. Thus, the segments 74 and 76 are practically parallel to the Y-direction.

The intermediate segment 78 is the segment that is most inclined with respect to the Y-direction. It is therefore the segment of the guide 60 that is potentially the most difficult to couple to a segment in proximity of the guide 40.

In this embodiment, the upstream half of the guide 60 has a single point of inflection 84 located between the points 70 and 72. This point 84 is located in the middle of the intermediate segment 78. In addition, the radius of curvature $Rmin_{60}$ is observed at this point of inflection 84. Here, the point 84 is in addition a centre of symmetry of the upstream half of the guide 60.

In this embodiment, the upstream half of the guide 60 extends along an S- or half-sinusoid-shaped path. For example, the equation of this path is defined by the following equation in an orthonormal coordinate system $X_B$, $Y_B$ the origin of which is located at the intersection of the limit 66 and of a vertical plane passing through the point 84 and parallel to the plane P1: y 32 (L/2) cos (πx/$d_x$), where:

y is the coordinate along the ordinate $Y_B$ coincident with the lateral limit 66, x is the coordinate along the abscissa $X_B$ parallel to the X-direction and contained in the plane P4, L/2 is the distance between the planes P4 and P3, $d_x$ is the offset, in the X-direction, between the start and end points of this path.

The start point of the path is contained in the plane P4 and the end point of this path is contained in the plane P3.

Under these conditions, the radius $Rmin_{60}$ at the point 84 is equal to $(L/2)^2/(\pi^2 d_x)$. To limit the optical losses due to curvatures in the guide 60, this radius $Rmin_{60}$ is chosen to be larger than 5 µm, 15 µm or 20 µm. Here, the radius $Rmin_{60}$ is larger than 100 µm or 200 µm.

Below, the following notations are used:

$n_{r60}$ is the refractive index of the core of the guide 60, and $n_{eff60}$ is the effective index of the guide 60 at the wavelength λ.

The effective index $n_{eff60}$ is constant over the entire length of the guide 60.

In order for evanescent optical coupling between segments in proximity of the guides 40 and 60 to be possible, the cross section of the guide 60 is dimensioned so that the index $n_{eff60}$ is comprised between 0.9 $n_{eff40}$ and 1.1 $n_{eff40}$. To this end, here, the cross section of the core of the guide 60 is identical to the cross section of the core of the guide 40. In addition, since the cores and the claddings of these guides 40 and 60 are made of the same materials, this means that the effective index $n_{eff60}$ is equal to the effective index $n_{eff40}$.

The refractive index $n_{r8}$ of each material that separates the guide 40 from each of the guides 60 is lower than 0.7 min($n_{r40}$, $n_{r60}$), where the symbol "min( ... )" designates the function that returns the lowest of the elements between parentheses.

Lastly, the distance that separates the horizontal plane containing the lower face 46 of the guide 40 from the horizontal plane containing the upper face of the guide 60 is small. Here, this distance is comprised between 50 nm and λ/2 and, preferably, between 50 nm and λ/4 or between 50 nm and λ/6. In the numerical examples presented in this patent application, this distance has been set equal to 200 nm.

Below, segments that are symmetrical to the segments 74, 76 and 78 of the guide 60 with respect to the plane P3 have been designated with the reference numbers 94, 96 and 98, respectively.

Figure 3:
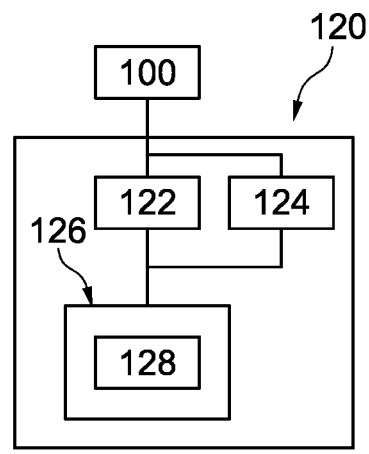
FIG. 3 is a flowchart of a process for designing and fabricating the assembly of FIG. 1.

The design and fabrication of the assembly 2 will now be described with reference to the process of FIG. 3.

The process starts with a phase 100 of designing the coupling device 20. In this phase 100, the various parameters that characterize the configuration of this device 20 are determined, for example, as explained below.

Initially, the parameter $d_x$ is chosen so that, whatever the x-position of the guide 40 above the guide 60, the guide 40 selectively couples to a single one of the segments of the upstream portion of the guide 60. The x-position indicates the position of the guide 40 in the X-direction. Below, the term "x-position" solely designates a position of the guide 40 located above the array 42. To this end, the parameter $d_x$ is chosen to be larger than λ/2 and also larger than two or three times the width of the guide 60 in the X-direction. The value of the parameter $d_x$ is also chosen to be low enough that the radius $Rmin_{60}$ is large and for example, larger than 100 µm. To this end, the value of the parameter $d_x$ is often chosen to be lower than 3λ or 4λ. For example, the value of the parameter $d_x$ is chosen between λ/2 and 1.5λ. Here, the value of the parameter $d_x$ is set equal to 1.2 µm.

Figure 4:
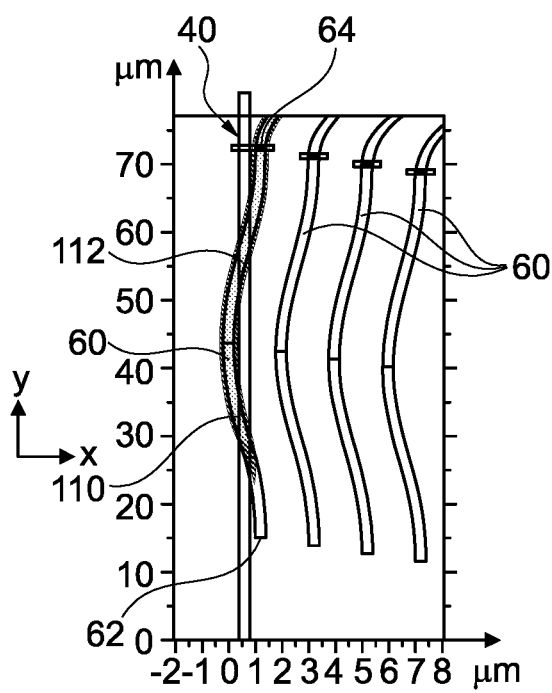
FIG. 4 is a schematic illustration of a view from above of the coupling region of FIG. 2 in one particular case.

Next, the value of the parameter L of the guide 60 is chosen to maximize the amount of energy transmitted between the guides 40 and 60. It has been determined that the x-position of the guide 40 the least favourable to the energy transmission between the guides 40 and 60 is the x-position $x=d_x/4$. The x-position $x=d_x/4$ is the position in which, in the coordinate system $X_B$, $Y_B$, the orthogonal projection of the guide 40 onto a horizontal plane containing the guide 60 passes through the point of coordinates ($d_x/4$; 0). This particular position of the guide 40 with respect to the guide 60 is schematically shown in FIG. 4. This is explained by the fact that, in this particular position, the guide 40 is in proximity to the segment 78 that is the most curved. In addition, in the particular case of the guide 60, this is also explained by the fact that destructive interference may occur between the optical signal that penetrates into this guide 60 via the segment 78 and the optical signal that penetrates into the segment 98.

Figure 5:
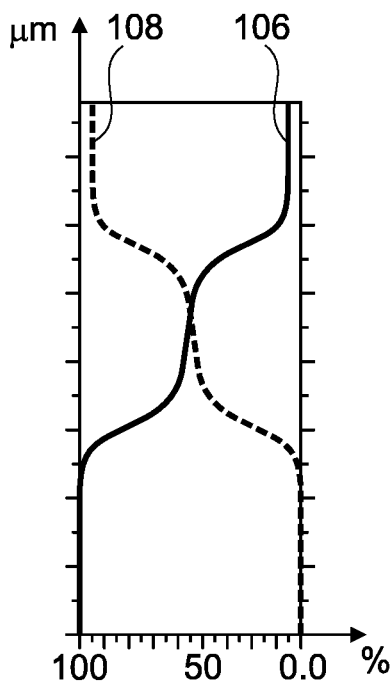
FIG. 5 is a graph illustrating the transfer of energy between two waveguides in the coupling region of FIG. 4.

FIG. 5 is a graph comprising two curves 106 and 108. The curves 106 and 108 represent the energy of the optical signal propagating through the guide 40 and through the guide 60 as the signal propagates in the Y-direction, respectively. In this graph, the abscissa represents the amount of energy of the optical signal in one guide in percent of the initial energy of the optical signal in the guide 40. The ordinate represents the distance travelled by the optical signal in the Y-direction. This graph was obtained for the relative position of the guides 40 and 60 shown in FIG. 4. To start with, 100% of the energy of the optical signal is in the guide 40. At a first crossing 110 (FIG. 4) between the guides 40 and 60, a first portion of the energy of the optical signal passes into the guide 60. Next, at a second crossing 112 (FIG. 4) between the guides 40 and 60, a second portion of the energy of the optical signal passes into the guide 60.

The amount of energy at the end 64, for various values of the parameter L of the guide 60, was constructed via numerical simulation. For example, the software package 3D-BPM (BPM standing for "Beam Propagation Method") from the company Synopsys® was used to this end.

The parameter L has a lowest value for which the energy of the optical signal at the end 64 is maximum. It is this value of the parameter L that is chosen. For example, in the particular case described here, the value of the parameter L was set equal to 57.5 µm. For this value, 93% of the energy of the optical signal initially in the guide 40 was transmitted to the guides 60 for the x-position $x=d_x/4$. For example, this value of the parameter L is sought between 0.7 $N_t$ and 1.5 $N_t$, where $N_t$ is equal to $\lambda/(2|n_{effa}-n_{effs}|)$, where $n_{effa}$ and $n_{effs}$ are the effective indices of the asymmetric and symmetric propagation modes, respectively. This relationship is derived from Equation (48) on page 6 of the following article: Henry F. TAYLOR et al.: "Guided Wave Optics", Proceedings of the IEEE, vol. 62, n08, 08/1974.

Next, the pitch $d_y$ is set. Here, the pitch $d_y$ was chosen so that the distance separating two immediately consecutive waveguides 50 was larger than λ/2 and preferably larger than λ. This allowed optical coupling of the waveguides 50 to one another to be avoided.

It has been established that the value of the pitch $d_y$ has very little influence on the coefficient of energy transmission through the interface 8, no matter what the x-position of the guide 40. Thus, there is a large possible choice of acceptable values for the pitch $d_y$. To minimize the footprint of the region 30, the pitch $d_y$ is chosen to be lower than L/10 or L/20. Here, the pitch $d_y$ was set equal to $d_x$.

Next, the parameter $d_{xc}$ is determined. Here, the parameter $d_{xc}$ was chosen to meet a first condition, namely that the guides 60 must not optically couple to one another. To this end, the value of the parameter $d_{xc}$ was such that the pitch $d_x-d_{xc}$ was larger than λ/2 or larger than 0.7λ. Moreover, the value of the parameter $d_{xc}$ was chosen to meet the following second condition: whatever the x-position of the guide 40, the coefficient of transmission through the interface 8 is higher than 50% or 60%. This coefficient of transmission is computed taking into account the sum of the energies of the optical signals at the near ends 64 of the guides 60. Thus, if for a given x-position a first segment of the guide 40 is coupled to one segment of a first guide 60 and a second segment of the guide 40 is optically coupled to a second segment of a second guide 60, the coefficient of transmission is computed taking into account that the transmitted energy is equal to the sum of the energies of the optical signals propagating through these first and second waveguides.

Figure 6:
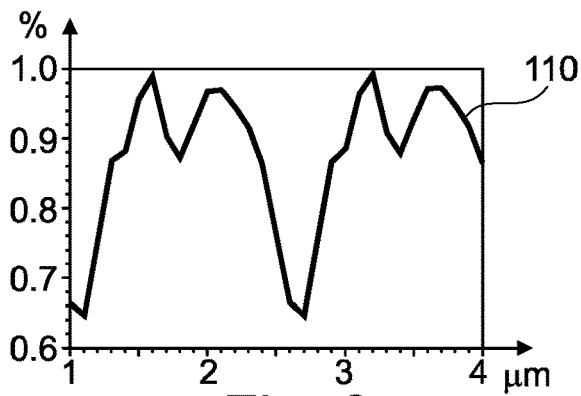
FIGS. 6, 7 and 8 are profiles of the coefficient of energy transmission between the first and second photonic chips of the assembly of FIG. 1 in various situations.
Figure 7:
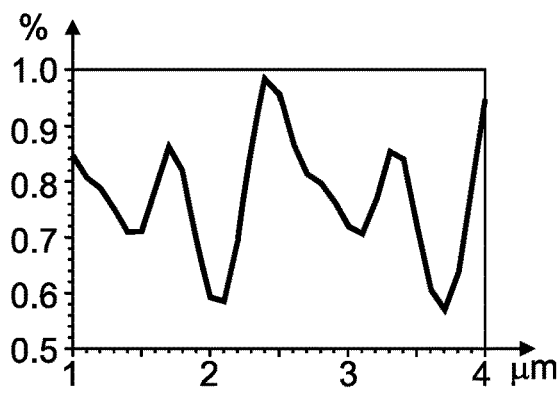

It has been observed that there are many possible values of the parameter $d_{xc}$ that meet the above two conditions. Therefore, here, the chosen value of the parameter $d_{xc}$ was the value that met the following third condition: the value of the parameter $d_{xc}$ maximizes, in addition, the average of the coefficients of energy transmission through the interface 8 for each possible x-position. To this end, here, a profile of energy transmission through the interface 8 was constructed for a plurality of possible values of the parameter $d_{xc}$. One example of such an energy profile constructed for the value $d_{xc}=-0.4$ µm is shown in FIG. 6. The abscissa represents the x-position of the guide 40. The ordinate represents the coefficient of energy transmission through the interface 8 expressed in percent. In FIG. 7, the symbol "1" designates the value 100%. Such a profile is constructed by numerical simulation using, for example, the software package 3D-BPM. The average of the values of the curve 110 (FIG. 7) corresponds to the average of the coefficients of transmission through the interface 8 for each possible x-position. The value of the parameter $d_{xc}$ that maximized this average was adopted. Here, the value that maximized this average was $d_{xc}=-0.4$ µm. For this value, the coefficient of transmission was higher than 60% for all the possible x-positions.

Lastly, the number N of guides 60 is chosen so that the length of the array 42 in the X-direction is larger than the tolerance of the placing tool in this direction. Thus, it is certain that the placing tool will be able to place the chip 4 on the chip 6 such that the guide 40 is located above the array 42. Under these conditions, the x-position necessarily corresponds to a position in which the coefficient of transmission is higher than 60%.

The placing tool also has an angular tolerance that means that the angle θ is not systematically equal to 0° but, in contrast, varies between $e_{min}$ and $e_{max}$. For conventional placing tools, this angular tolerance is often comprised between −0.1° and +0.1°.

Figure 8:
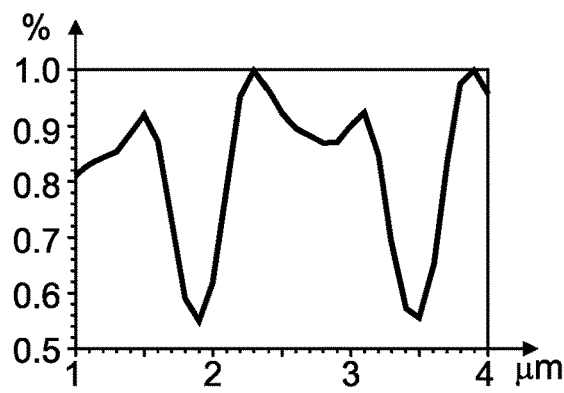

FIGS. 7 and 8 show profiles of energy transmission that were obtained with the same parameter values as those used to obtain the profile of FIG. 7, but this time for θ=−1° (FIGS. 7) and θ=+1° (FIG. 8). The profile of FIG. 6 was obtained for the angle θ=0°. As may be seen, the coefficient of transmission in these profiles remains systematically higher than 55%. Thus, the region 30 allows a coefficient of energy transmission through the interface 8 higher than 50% to be obtained whatever the value of the angle θ comprised between −1° and +1°. In addition, for the values θ=−0.1° and θ=+0.1°, the coefficient of transmission remains systematically higher than 60%. The coupling device 20 is therefore compatible with assembly of the chips 4 and 6 using a placing tool having an angular tolerance of plus or minus 0.1°.

Once the design phase 100 has ended, a phase 120 of fabricating the assembly 2 is executed. The phase 120 is essentially composed of three steps 122, 124 and 126.

The step 122 is a step of fabricating the photonic chip 4 and therefore the portion of the device 20 produced in this chip 4. This step 122 therefore notably comprises production of the guide 40.

The step 124 is a step of fabricating the chip 6 and therefore the portion of the device 20 produced in this chip 6. Step 124 therefore comprises producing the array 42, the phase-matching region 30 and the summer 34. Step 124 is carried out independently of step 122.

Step 126 is a step of bonding the chip 4 to the chip 6 to obtain the assembly 2. Step 126 notably comprises a step 128 of placing, using the placing tool, the chip 4 on the chip 6. In the operation 128, the guide 40 is placed above the array 42.

Figure 9:
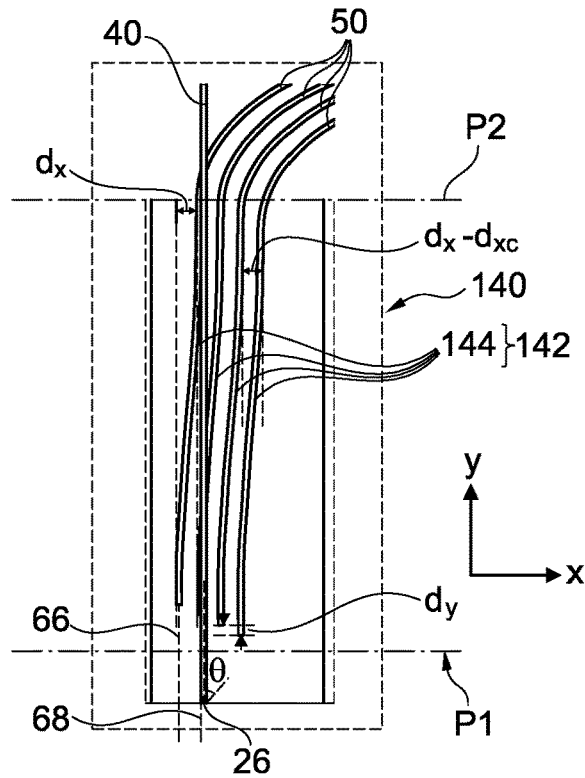
FIG. 9 is a schematic illustration of another embodiment of a coupling region capable of being used instead of the coupling region of FIG. 2.

FIG. 9 shows an optical coupling device 140 that is identical to the device 20 except that the array 42 has been replaced by an array 142. The array 142 is identical to the array 42 except that each waveguide 60 has been replaced by a waveguide 144. The guide 144 is identical to the guide 60 except that the downstream half of the guide 60 has been omitted. Thus, each guide 144 is here identical to the upstream half of the guide 60, after having undergone a symmetry with respect to an axis parallel to the Y-direction. Thus, in this embodiment, each guide 144 comprises only two points of contact with the lateral limits 66 and 68, respectively, and therefore also a single point of inflection.

The operation of the device 140 is the same as that of the device 20. However, because of the absence of symmetry of each guide 144 with respect to a vertical plane parallel to the X-direction, the tolerance with respect to an angular positioning error of the guide 40 is less symmetric. In other words, the angular range in which the values of the angle θ may be comprised while preserving a coefficient of transmission higher than 50% is not symmetric with respect to the value 0°.

In the case of the guide 144, the x-position of the guide 40 that is least favourable to the energy transmission between the guides 40 and 144 is the x-position x=$d_x$/2. It is therefore this x-position x=$d_x$/2 that is used to determine the value of the parameter L.

SECTION II: VARIANTS

Variant of the Waveguides 40, 60 and 144

As a variant, the guide 40 is not rectilinear but curved. For example, the guide 40 is replaced by a curved guide. The shape of this curved guide is for example symmetric to the shape of the guide 60 with respect to a vertical plane parallel to the Y-direction. In this case, both the guide 40 and the guide 60 are curved.

If the alignment error in the Y-direction of the placing tool is negligible, then the guide 40 is not necessarily longer than the guide 60. In this case, the guide 40 may start at the plane P1 and end at the plane P2.

Many other embodiments of the guide 60 or 144 are possible. For example, the guide 60 or 144 may comprise more than three or four points of contact with the limits 66 and 68. In this case, the guide 60 or 144 comprises more than two points of inflection.

In another embodiment, the segments 74 and 76 are rectilinear and parallel to the Y-direction.

The guides 60 and 144 may also be rectilinear and not curved. In this case, the guide 40 must be curved in order to have an upstream segment and a downstream segment that are offset in the X-direction. For example, the guide 40 is configured as described with respect to the guide 60 or 144. In this embodiment, the parameters $d_x$ and L characterize the configuration of the guide 40 and no longer the configuration of the guide 60 or 144. The guide 60 or 144 is dimensioned as described above with respect to the guide 40. In particular, the length in the Y-direction of the guide 60 or 144 is chosen to be much larger than that of the guide 40. Next, the guide 40 is configured, and notably the values of the parameters $d_x$ and L of the guide 40 chosen, as described above with respect to the guide 60. Lastly, the value of the pitch $d_x$-$d_{xc}$ between the rectilinear guides 60 or 144 is determined as described above with respect to the array 42. Under these conditions, whatever the x-position of the curved guide 40, segments of this guide are able to couple, via evanescent coupling, to segments in proximity of one or two rectilinear guides 60 or 144.

The value of the parameter $d_x$ may be chosen so that the guide 40 comprises a segment optically coupled via evanescent coupling to a first copy of the guide 60 and a second segment optically coupled to a second copy of the guide 60, a third copy of the guide 60 being located between these first and second copies of the guide 60.

The value of the parameter $d_{xc}$ may be chosen without taking into account the third condition according to which the average of the coefficients of transmission for the various x-positions is maximized.

Other Variants:

The optical coupling between the guide 40 and any one of the guides 50 may be avoided differently. For example, the dimensions of the core of the guide 50 are adjusted so that its effective index is very different from the effective index $n_{eff40}$. This prevents optical coupling of this guide 50 to the guide 40 without, to this end, having to adopt a particular path for the guide 50.

The phase shifter 54 may be produced in a different way. For example, as a variant, the heater is replaced by an adjustable phase shifter involving a p-i-n diode. In one very simple embodiment, the length of each of the guides 50 is adjusted so that the optical signals received on the inputs of the summer 34 are in phase. Preferably, this adjustment of the lengths of the guides 50 is combined with use of an adjustable phase shifter like those described above. In another embodiment, this adjustment of the lengths of the guides 50 is followed, after the chips have been bonded to each other, by an operation of implanting impurities into the guides 50 in order to adjust the phase shift between the optical signals propagating through these guides and to obtain optical signals that are in phase on the inputs of the power summer. For example, such implantation methods for adjusting the phase of an optical signal propagating through a waveguide are described in patent application FR1553024.

In another embodiment, the phase shifter is produced by placing a phase-change material in proximity to the core of the waveguide coupled to electrodes in order to make a current pass therethrough. The mode will therefore see a different effective index depending on the state of the crystalline phase of the phase-change material. For example, the phase-change material is GeSbTe, which is known by the acronym GST.

SECTION III: ADVANTAGES OF THE DESCRIBED EMBODIMENTS

Use of evanescent coupling between the guide 40 and the guide 60 or 144 is a simple means of optically coupling the chip 4 to the chip 6 through the bonding interface 8. In particular, such evanescent coupling is simpler to produce than known devices that require optical components such as a lens or a mirror to be employed. In addition, the coupling devices described here are tolerant at least with respect to alignment errors in the X-direction.

The fact that the curved guide undulates between two lateral limits and has a single point of inflection between two successive right and left points of contact makes it possible to make the coupling device tolerant with respect to angular positioning errors of the chip 4 on the chip 6.

The fact that each curved guide has a vertical plane of symmetry parallel to the X-direction allows a tolerance to be obtained with respect to angular positioning errors that is symmetric with respect to the angular position in which this angular positioning error is zero. In other words, this tolerance is the same with respect to angular positioning errors in the clockwise and anti-clockwise directions.

The fact that the curved guide comprises only two points of inflection allows the number of intermediate segments in which the optical coupling between the curved guide and the guide 40 is more difficult to obtain to be minimized. This therefore allows the length of the curved guide to be limited and therefore the footprint of the coupling device to be decreased.

The invention claimed is:

1. An assembly comprising:
    first and second photonic chips adjoined to each other by bonding via a bonding interface,
    an optical coupling device that optically connects together the first and second photonic chips through the bonding interface in order to allow propagation between the first and second photonic chips of an optical signal at a predetermined wavelength $\lambda$, said optical coupling device comprising first and second portions produced in the first and second chips, respectively,
    the first portion of the optical coupling device comprises a first waveguide that mainly extends in a first direction parallel to the bonding interface,
    the second portion of the optical coupling device comprises a second waveguide able to be optically coupled to the first waveguide, when the first waveguide is located above said second waveguide, via evanescent coupling that allows at least 50% of the energy of the optical signal, at the wavelength $\lambda$, propagating through the first waveguide to be transferred to said second waveguide,
    wherein:
    the second portion of the optical coupling device comprises:
    an array of a plurality of identical copies of the second waveguide, these second waveguides being offset with respect to one another, in a second direction, by a pitch larger than $\lambda/2$, said second direction being parallel to the bonding interface and perpendicular to the first direction, and
    a power summer comprising inputs that are optically connected to one end of each of the second waveguides of the array, and an output on which the summer delivers the addition of the optical signals propagating through each of the second waveguides,
    each of the first and second waveguides comprises upstream, intermediate and downstream segments placed immediately one after the other in the direction of propagation of the optical signal, the upstream and downstream segments of the first waveguide or of each second waveguide being offset with respect to each other in the second direction, and
    the configurations of the first waveguide and of the second waveguides are such that, for any position of the first waveguide above the array of second waveguides, the distance between one of the segments of the first waveguide and one of the segments of one of the second waveguides is smaller than $\lambda/2$.

2. The assembly according to claim 1, wherein the waveguide the upstream and downstream segments of which are offset comprises the following features:
    said waveguide is entirely comprised between left and right lateral limits, each of these lateral limits being rectilinear and parallel to the first direction,
    said waveguide is tangent to the left lateral limit at at least one first left point of contact and tangent to the right lateral limit at at least one right point of contact, and
    between each pair of left and right points of contact immediately consecutive along said waveguide, the waveguide has a single point of inflection.

3. The assembly according to claim 2, wherein the waveguide the upstream and downstream segments of which are offset is symmetric with respect to a plane perpendicular to the first direction.

4. The assembly according to claim 3, wherein the waveguide the upstream and downstream segments of which are offset comprises solely three points of contact forming two different pairs of left and right points of contact immediately consecutive along said waveguide.

5. The assembly according to claim 2, wherein the distance between the left and right lateral limits is larger than $\lambda/2$.

6. The assembly according to claim 1, wherein:
    the first waveguide has an effective index $n_{eff1}$ at the wavelength $\lambda$, and comprises a core comprising a first face turned toward the bonding interface, said first face lying in a first plane parallel to the bonding interface, said core being made of a material of refractive index $n_{r1}$ at the wavelength $\lambda$,
    each second waveguide has an effective index $n_{eff2}$ at the wavelength $\lambda$, comprised between $0.9 n_{eff1}$ and $1.1 n_{eff1}$ and comprises a core comprising a second face turned toward the bonding interface, said core being made of a material of refractive index $n_{r2}$ at the wavelength $\lambda$, said second face lying in a second plane parallel to the bonding interface, the distance between the second plane and the first plane being comprised between 50 nm and $\lambda/2$,
    the space between the first and second planes is filled with a material the refractive index of which at the wavelength $\lambda$ is lower than $0.7 \text{Min}(n_{r1}; n_{r2})$, where $\text{Min}(n_{r1}; n_{r2})$ is the function that returns the lowest of the refractive indices $n_{r1}$ and $n_{r2}$.

7. The assembly according to claim 1, wherein:
    all of the upstream and downstream segments that are offset with respect to each other are located between a first plane and a second plane that are perpendicular to the first direction, and the waveguide the upstream and downstream segments of which are not offset is a rectilinear waveguide the length of which is larger than d1+3 µm, where d1 is the distance that separates the first and second planes.

8. The assembly according to claim 1, wherein the second portion of the optical coupling device comprises an adjustable phase shifter able, after the first and second photonic chips have been bonded to each other, to adjust the phase of the optical signals received on the inputs of the power summer so that these optical signals arrive in phase on the inputs of the power summer.

9. A second photonic chip for producing an assembly according to claim 1, said second photonic chip comprising:
- a bonding interface intended to adjoin said second photonic chip to the first photonic chip, and
- the second portion of the optical coupling device, which optically connects together the first and second photonic chips through the bonding interface in order to allow propagation between the first and second photonic chips of an optical signal at a predetermined wavelength $\lambda$, said second portion comprising a second waveguide able to be optically coupled to the first waveguide, when the first waveguide is located above said second waveguide, via evanescent coupling that allows at least 50% of the energy of the optical signal, at the wavelength $\lambda$, propagating through the first waveguide to be transferred to said second waveguide, wherein:
the second portion of the optical coupling device comprises:
- an array of a plurality of identical copies of the second waveguide, these second waveguides being offset with respect to one another, in a second direction, by a pitch larger than $\lambda/2$, said second direction being parallel to the bonding interface and perpendicular to the first direction, and
- a power summer comprising inputs that are optically connected to one end of each of the second waveguides of the array, and an output on which the summer delivers the addition of the optical signals propagating through each of the second waveguides,
- each of the second waveguides comprises upstream, intermediate and downstream segments placed immediately one after the other in the direction of propagation of the optical signal, the upstream and downstream segments of each second waveguide being offset with respect to each other in the second direction, and
- the configurations of the second waveguides are such that, for any position of the first waveguide above the array of second waveguides, the distance between one of the segments of the first waveguide and one of the segments of one of the second waveguides is smaller than $\lambda/2$.

10. The process for fabricating an assembly according to claim 1, wherein the process comprises:
- bonding, via a bonding interface, first and second photonic chips adjoined to each other,
- producing an optical coupling device that optically connects together the first and second photonic chips through the bonding interface in order to allow propagation between the first and second photonic chips of an optical signal at a predetermined wavelength $\lambda$, said optical coupling device comprising first and second portions produced in the first and second chips, respectively,
- the first portion of the optical coupling device comprising a first waveguide that mainly extends in a first direction parallel to the bonding interface,
- the second portion of the optical coupling device comprising a second waveguide able to be optically coupled to the first waveguide, when the first waveguide is located above said second waveguide, via evanescent coupling that allows at least 50% of the energy of the optical signal, at the wavelength $\lambda$, propagating through the first waveguide to be transferred to said second waveguide,
- wherein production of the coupling device comprises producing a coupling device in which:
- the second portion of the optical coupling device comprises:
- an array of a plurality of identical copies of the second waveguide, these second waveguides being offset with respect to one another, in a second direction, by a pitch larger than $\lambda/2$, said second direction being parallel to the bonding interface and perpendicular to the first direction, and
- a power summer comprising inputs that are optically connected to one end of each of the second waveguides of the array, and an output on which the summer delivers the addition of the optical signals propagating through each of the second waveguides,
- each of the first and second waveguides comprises upstream, intermediate and downstream segments placed immediately one after the other in the direction of propagation of the optical signal, the upstream and downstream segments of the first waveguide or of each second waveguide being offset with respect to each other in the second direction, and
- the configurations of the first waveguide and of the second waveguides are such that, for any position of the first waveguide above the array of second waveguides, the distance between one of the segments of the first waveguide and one of the segments of one of the second waveguides is smaller than $\lambda/2$.

* * * * *

UNITED STATES PATENT AND TRADEMARK OFFICE
CERTIFICATE OF CORRECTION

| | |
|---|---|
| PATENT NO. | : 11,714,237 B2 |
| APPLICATION NO. | : 17/454655 |
| DATED | : August 1, 2023 |
| INVENTOR(S) | : Karim Hassan |

Page 1 of 1

It is certified that error appears in the above-identified patent and that said Letters Patent is hereby corrected as shown below:

In the Claims

In Column 12, Claim 6, Line 44, delete "$\lambda$," and insert -- $\lambda$ --, therefor.

In Column 12, Claim 6, Line 48, delete "$n_{rl}$" and insert -- $n_{r1}$ --, therefor.

In Column 12, Claim 6, Line 50, delete "$\lambda$," and insert -- $\lambda$ --, therefor.

Signed and Sealed this
Twenty-eighth Day of November, 2023

*Katherine Kelly Vidal*

Katherine Kelly Vidal
*Director of the United States Patent and Trademark Office*